US008996889B2

(12) United States Patent
Consalus et al.

(10) Patent No.: US 8,996,889 B2
(45) Date of Patent: Mar. 31, 2015

(54) PORTABLE COMPUTING DEVICE WITH METHODOLOGIES FOR CLIENT-SIDE ANALYTIC DATA COLLECTION

(71) Applicant: Dropbox, Inc., San Francisco, CA (US)

(72) Inventors: Kyle Consalus, San Francisco, CA (US); Alex Sydell, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 91 days.

(21) Appl. No.: 13/853,315

(22) Filed: Mar. 29, 2013

(65) Prior Publication Data
US 2014/0298041 A1 Oct. 2, 2014

(51) Int. Cl.
*G06F 21/00* (2013.01)
*G06F 21/60* (2013.01)
*G06F 11/34* (2006.01)

(52) U.S. Cl.
CPC .......... *G06F 21/602* (2013.01); *G06F 11/3476* (2013.01)
USPC .......................................................... 713/193

(58) Field of Classification Search
CPC ............................ G06F 21/602; G06F 11/3476
USPC ................................................................ 713/193
See application file for complete search history.

(56) References Cited

U.S. PATENT DOCUMENTS

| 7,953,425 | B2 | 5/2011 | Jordan |
| 8,316,046 | B2 | 11/2012 | Huang et al. |
| 8,340,719 | B1 | 12/2012 | Zands |
| 8,832,116 | B1 * | 9/2014 | Chu et al. ...................... 707/748 |
| 2006/0168170 | A1 * | 7/2006 | Korzeniowski ............... 709/223 |
| 2007/0198789 | A1 * | 8/2007 | Clark et al. .................... 711/162 |
| 2007/0243887 | A1 * | 10/2007 | Bandhole et al. ............. 455/461 |
| 2010/0161506 | A1 * | 6/2010 | Bosenick et al. ............. 705/347 |
| 2010/0185534 | A1 * | 7/2010 | Satyavolu et al. ............. 705/30 |
| 2011/0154023 | A1 * | 6/2011 | Smith et al. ................... 713/155 |
| 2013/0124483 | A1 * | 5/2013 | Furuhashi et al. ............. 707/661 |
| 2013/0325905 | A1 * | 12/2013 | Dake et al. .................... 707/802 |
| 2014/0006244 | A1 * | 1/2014 | Crowley et al. ................ 705/37 |
| 2014/0059271 | A1 * | 2/2014 | Meir et al. ..................... 711/103 |
| 2014/0075098 | A1 * | 3/2014 | Uno, Toru ..................... 711/103 |

* cited by examiner

*Primary Examiner* — Michael Pyzocha
(74) *Attorney, Agent, or Firm* — Hickman Palermo Becker Bingham LLP

(57) ABSTRACT

A portable computing device with methodologies for client-side analytic data collection are described. In one embodiment, for example, a method performed by a portable computing device having volatile and non-volatile memory includes obtaining a plurality of events to be logged; serializing the events to be logged; storing the serialized events in the volatile memory; encrypting the serialized events to produce serialized and encrypted events; storing the serialized and encrypted events in the non-volatile memory; decrypting the serialized and encrypted events to produce serialized and decrypted events; storing the serialized and decrypted events in the volatile memory; compressing the serialized and decrypted events to produce compressed, serialized, and decrypted events; encrypting the compressed, serialized, and decrypted events to produce encrypted, compressed, and serialized events and storing the encrypted, compressed, and serialized events in the non-volatile memory.

30 Claims, 7 Drawing Sheets

PORTABLE COMPUTING DEVICE WITH METHODOLOGIES FOR CLIENT-SIDE ANALYTIC DATA COLLECTION

TECHNICAL FIELD

Some embodiments of the present invention relate generally to portable computing devices with methodologies for logging information and, more particularly, to a portable computing device with methodologies for client-side analytic data collection.

BACKGROUND

The first web applications were largely server-based with little or no functionality implemented by dedicated applications executing at end-user client computing devices. Transitions between application states were mainly accomplished with request/response round-trips over a network between end-user devices and server devices. Typically, a web browser executing on an end-user device would send, to a server device, a Hypertext Transfer Protocol (HTTP) request specifying a Web address (e.g., a URL) that identified the next user interface state (e.g., a new web page). In response, the server device would send, back to the end-user device, a HTTP response including Hypertext Markup Language (HTML) content of the requested user interface state. The web browser would then update a user interface (e.g., a web page window) displayed at the end-user computing device based on the received HTML content. With the first web applications, logging information about application behavior and user interaction with such applications was relatively simple because overall application functionality was centralized on the server-side.

With the ever-increasing computing power and capabilities of end-user devices, however, more and more application functionality is being implemented by dedicated software designed to execute on end-user devices. One class of dedicated software applications designed to run on portable computing devices, such as mobile phones, tablet computers, and other mobile devices, are commonly known as "mobile applications". Today, mobile applications are available that perform a wide-variety of different functions. As just a few examples, there are mobile applications for general productivity, information retrieval, playing games, checking e-mail, calendaring, banking, and many others.

Many mobile applications can transition between some application states without having to interact with a server. Because of this, developers of mobile applications often have little insight into how their applications behave for users and how and where users interact with their applications. Such insight is valuable to developers, for example, to improve the functionality of the applications they offer. For example, a developer of a mobile application might want to know which operating system platform the application is most often used on, which features of the application are most often used, which features are rarely used, which countries the application is used in, which features cause the application to crash or generate errors, among other usage information.

For many developers, the ability to capture information about the runtime behavior and user interaction with their mobile applications would be useful to gain the desired insight into how their applications behave for users and how and where users interact with their applications. Accordingly, there is a need for portable computing devices with more efficient methods for collecting information about the runtime behavior and user interaction with mobile applications executing on the devices. Such methods should reduce the performance impact on end-user facing functions of the applications. For battery-operated portable computing devices, such methods should conserve power and increase the time between battery charges.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF SOME EMBODIMENTS

A portable computing device with methodologies for client-side analytic data collection are described. In one embodiment, for example, a computer-implemented method is provided for execution at a portable computing device having volatile memory and non-volatile memory. The method includes obtaining a plurality of events to be logged; serializing the plurality of events to be logged to produce a serialized form of the events; storing the serialized form of the events in volatile memory of the device; encrypting the serialized form of the events to produce a serialized and encrypted form of the events; storing the serialized and encrypted form of the events in non-volatile memory of the device; decrypting the serialized and encrypted form of the events to produce a serialized and decrypted form of the events; storing the serialized and decrypted form of the events in volatile memory of the device; compressing the serialized and decrypted form of the events to produce a compressed, serialized, and decrypted form of the events; encrypting the compressed, serialized, and decrypted form of the events to produce an encrypted, compressed, and serialized form of the events and storing the encrypted, compressed, and serialized form of the events in non-volatile memory of the device.

DETAILED DESCRIPTION

Glossary

Figure 1:
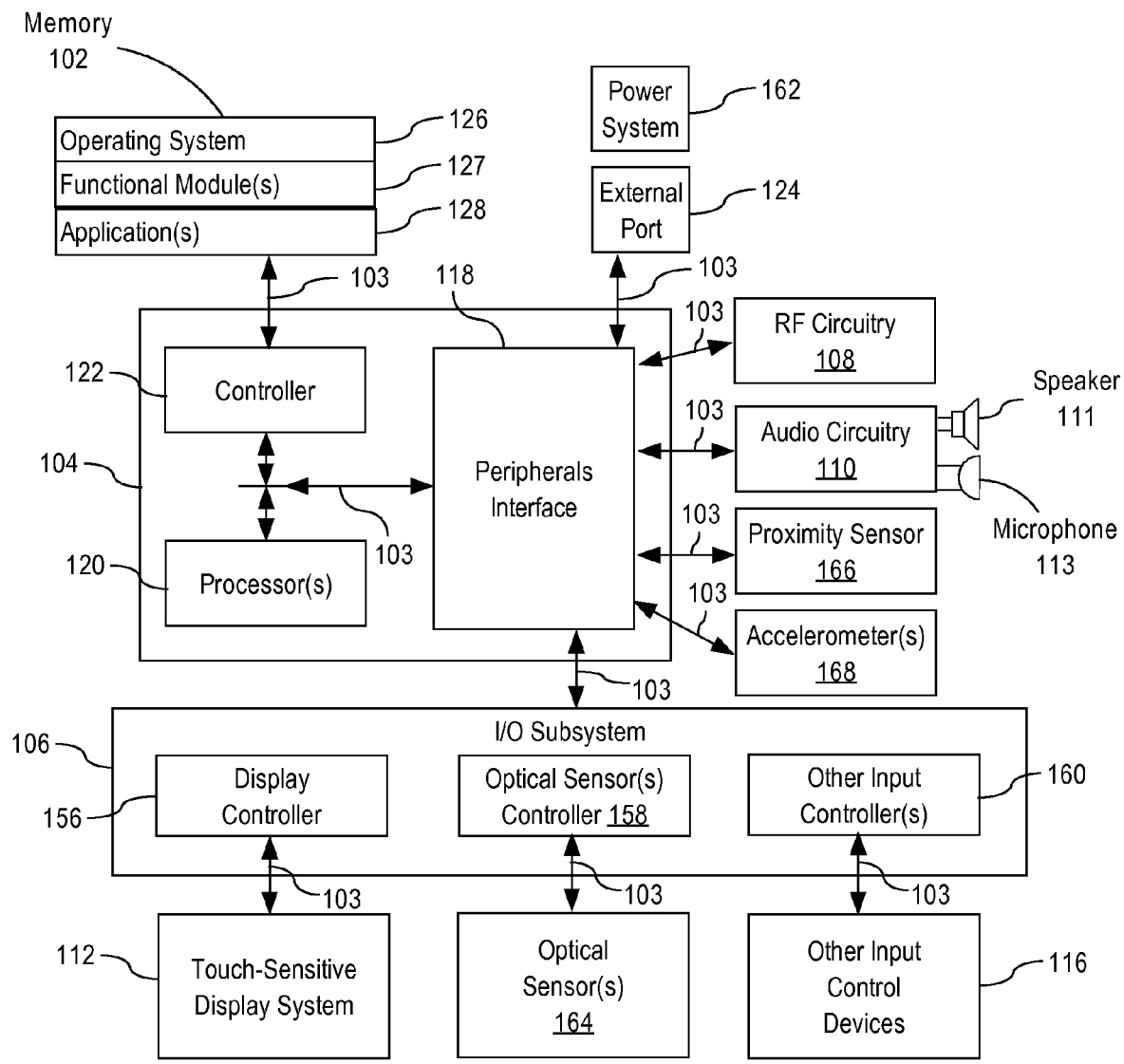
FIG. 1 is a very general block diagram of a portable computing device which can be used for implementing some embodiments of the present invention.

HTTP: HTTP is the acronym for "HyperText Transfer Protocol", which is the underlying communication protocol used by the World Wide Web on the Internet. HTTP defines how messages are formatted and transmitted, and what actions Web servers and browsers should take in response to various commands. For example, when a user enters a URL in his or her browser, this actually sends an HTTP command to the Web server directing it to fetch and transmit the requested Web page. Further description of HTTP is available in RFC 2616: Hypertext Transfer Protocol—HTTP/1.1, the disclosure of which is hereby incorporated by reference. RFC 2616 is available from the World Wide Web Consortium (W3), and is currently available via the Internet at /Protocols in the www.w3c.org domain. Additional description of HTTP is available in the technical and trade literature; see e.g., William Stallings, The Backbone of the Web, BYTE, October 1996, the disclosure of which is hereby incorporated by reference.

JSON: JSON stands for "JavaScript Object Notation", which a text-based standard for human-readable data interchange between computers. The JSON format was originally specified by Douglas Crockford and is described in RFC 4627: The application/json Media Type for JavaScript Object Notation (JSON), the disclosure of which is hereby incorporated by reference. RFC 4627 is available from the Internet Engineering Task Force (IETF), and is currently available via the Internet at /html/rfc4627 in the tools.ietf.org domain.

INTRODUCTION

Referring to the figures, exemplary embodiments of the invention will now be described. The following description will focus on some embodiments of the present invention, which are implemented in portable computing device software (e.g., driver, application, or the like) operating in an Internet-connected environment running under a mobile operating system, such as the ANDROID operating system. Some embodiments of the present invention, however, are not limited to any one particular application or any particular environment. Instead, those skilled in the art will find that the system and methods of some embodiments of present invention can be advantageously embodied on a variety of different platforms, including BLACKBERRY, IOS, S40, WINDOWS PHONE, WINDOWS 8, WINDOWS RT, and the like. Therefore, the description of the exemplary embodiments that follows is for purposes of illustration and not limitation.

The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Computer-Based Implementation

Some embodiments of the present invention can be implemented on a conventional or general-purpose computing device, such as personal computing device (e.g., a stationary or portable personal computing device) or a server computing device. In some embodiments, the present invention is implemented on a portable personal computing device such as a mobile phone or smart phone.

FIG. 1 is a very general block diagram of a portable computing device 100 according to some embodiments of the present invention. As shown, device 100 can include memory 102 (which can include one or more computer-readable storage mediums), memory controller 112, one or more processing units (CPUs) 120, peripherals interface 118, RF circuitry 108, audio circuitry 110, speaker 111, microphone 113, input/output (I/O) subsystem 106, touch-sensitive display system 112, other input or control devices 116, and external port 124. Although not shown separately, a real time system clock can be included with device 100, in a conventional manner. These components can communicate over one or more communication buses or signal lines 103.

Memory 102 can include high-speed random access memory and can also include non-volatile memory, such as one or more magnetic disk storage devices, flash memory devices, or other non-volatile solid-state memory devices. Access to memory 102 by other components of device 100, such as CPU 120 and peripherals interface 118, can be controlled by memory controller 122.

Peripherals interface 118 couples the input and output peripherals of device 100 to the CPU 120 and memory 102. One or more processors 120 run or execute various software programs and/or sets of instructions stored in memory 102 to perform various functions for device 100 and to process data.

In some embodiments, peripherals interface 118, CPU 120, and memory controller 122 are implemented on a single chip, such as chip 104. In some other embodiments, they are implemented on separate chips.

The RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 can include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 can communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (not shown). The headset jack provides an interface between audio circuitry 110 and removable audio input/output peripherals, such as output-only headphones or a headset with both output (e.g., a headphone for one or both ears) and input (e.g., a microphone).

The I/O subsystem 106 couples input/output peripherals on device 100, such as the touch screen 112 and other input/control devices 116, to peripherals interface 118. I/O subsystem 106 can include display controller 156 and one or more input controllers 160 for other input or control devices. One or more input controllers 160 receive/send electrical signals from/to other input or control devices 116. Other input/control devices 116 can include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. One or more buttons (not shown) may include an up/down button for volume control of speaker 111 and/or microphone 113. The one or more buttons may include a push button (not shown). A quick press of the push button may disengage a lock of the touch screen 112 or begin a process that uses gestures on the touch screen to unlock the device. A longer press of the push button can turn power to device 100 on or off. The user may be able to customize a functionality of one or more of the buttons. Touch screen 112 is used to implement virtual or soft buttons and one or more soft keyboards.

Touch-sensitive touch screen 112 provides an input interface and an output interface between the device and a user. Display controller 156 receives and/or sends electrical signals from/to the touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on the touch screen. In an exemplary embodiment, a point of contact between touch screen 112 and the user corresponds to a finger of the user.

Touch screen 112 can use LCD (liquid crystal display) technology, or LPD (light emitting polymer display) technology, although other display technologies may be used in other embodiments. Touch screen 112 and display controller 156 can detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112.

Device 100 also includes power system 162 for powering the various components. Power system 162 can include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 can also include one or more optical sensors 164. Optical sensor 164 can include charge-coupled device (CCD) or complementary metal-oxide semiconductor (CMOS) phototransistors. Optical sensor 164 receives light from the environment, projected through one or more lens, and converts the light to data representing an image. Optical sensor 164 can capture still images or video. In some embodiments, optical sensor 164 is located on the back of device 100, opposite touch screen display 112 on the front of device 100, so that touch screen display 112 can be used as a viewfinder for either still and/or video image acquisition. In some embodiments, optical sensor 164 is located on the front of device 100 so that the user's image may be obtained for videoconferencing while the user views the other video conference participants on touch screen display 112. In some embodiments, the position of optical sensor 164 can be changed by the user (e.g., by rotating the lens and the sensor in the device housing) so that a single optical sensor can be used along with touch screen display 112 for both video conferencing and still and/or video image acquisition.

Device 100 can also include one or more proximity sensors 166. Proximity sensor 166 can be coupled to peripherals interface 118. Alternately, proximity sensor 166 can be coupled to input controller 160 in I/O subsystem 106. In some embodiments, proximity sensor 166 turns off and disables touch screen 112 when device 100 is placed near the user's ear (e.g., when the user is making a phone call). In some embodiments, proximity sensor 166 keeps screen 112 off when device 100 is in the user's pocket, purse, or other dark area to prevent unnecessary battery drainage when device 100 is a locked state.

Device 100 can also include one or more accelerometers 168. Accelerometer 168 can be coupled to peripherals interface 118. Alternately, accelerometer 168 can be coupled to input controller 160 in I/O subsystem 106. In some embodiments, information is displayed on touch screen display 112 in a portrait view or a landscape view based on an analysis of data received from accelerometer 168.

Device 100 can also include one or more external ports 124. External port 124 can be coupled to peripherals interface 118. Alternatively, external port 124 can be coupled to input controller 160 in I/O subsystem 106. The external port 124 (e.g., Universal Serial Bus (USB), FIREWIRE, etc.) can be adapted for coupling directly to other devices or indirectly over a network (e.g., the Internet, wireless LAN, etc.). In some embodiments, the external port is a multi-pin (e.g., 30-pin) connector.

In some embodiments, the software components stored in memory can include an operating system 126, one or more functional modules 127, and one or more applications 128.

Operating system 126 (e.g., ANDROID, BLACKBERRY, IOS, S40, WINDOWS PHONE, WINDOWS 8, WINDOWS RT, or the like) includes various software components and/or drivers for controlling and managing general system tasks (e.g., memory management, storage device control, power management, etc.) and facilitates communication between various hardware and software components.

Functional modules 127 include software components or sets of instructions supporting one or more different functions of device 100 including, as non-limiting examples, communications functions (e.g., facilitating communication with other devices over external ports 124), contact/motion detection functions (e.g., detecting contact with touch screen 112 or other touch sensitive device), graphics functions (e.g., rendering and displaying graphics on touch screen 112), text input functions (e.g., supporting a soft keyboard function of device 100), or Global Positions Satellite (GPS) functions (e.g., determining geographic location of device 100).

Applications 128 can include software components, modules, or sets of instructions implementing application functions on device 100 including, as non-limiting examples, e-mail functions, instant messaging functions, gaming functions, calendaring functions, JAVA-enabled applications, etc. In one exemplary embodiment, one of applications 128 is a version of the "Dropbox for mobile" application available from Dropbox, Inc. of San Francisco, Calif.

The above-described device is presented for purposes of illustrating examples of the basic underlying computer components that can be employed for implementing some embodiments of the present invention. However, it should be understood that other devices including devices with more, less, or different computer components that those described above can be employed for implementing some embodiments of the present invention. Further, for purposes of discussion, the following description will present examples of client-side analytic data collection in a JAVA-enabled application operating in an ANDROID operating system environment. Some embodiments of the present invention, however, are not limited to any particular environment or device configuration. In particular, a JAVA-enabled application or an ANDROID operating system environment is not necessary to all embodiments of the invention, but is used to provide a framework for discussion. Instead, some embodiments of the present invention can be implemented in any type of device, system architecture, and processing environment capable of supporting the methodologies of embodiments presented in detail below.

Overview

In accordance with some embodiments of the present invention, a logging system is provided for collecting analytic data on the runtime behavior of and user interaction with an application executing on a portable computing device. Here, "analytic data", can be considered to be any data useful for analyzing the runtime behavior of or the user interaction with the application. For example, the analytic data can be sent to an analytics server for analysis, perhaps even in conjunction with analytic data sent to the server from other user devices running the application. Thus, analytic data is not necessarily data on which analysis has been conducted or data that reflects results of data analysis, but it can be. Non-limiting examples of analytic data include, but are not limited to, data reflecting user interaction with graphical user interface elements of the application (e.g., when and what user interface windows are open and closed, when user interface windows are backgrounded, etc.), data reflecting user usage of certain application features (e.g., when a user uses a photo upload feature of the application, if and when a user uses a help function, etc.), data reflecting device resources (e.g., device battery level, memory usage, etc.), data reflecting errors in application (e.g., uncaught exceptions, unexpected errors, etc.), data reflecting network performance and usage (e.g., when a network connection is established by the application, byte-rate of received data over the network connection, etc.), data reflecting interaction with third-party applications (e.g., when the application is used to send information to FACE-BOOK or TWITTER), or any other data useful for analysis of application behavior and user usage thereof.

The logging system is lightweight in the sense that it facilitates collection of useful analytic data generated by the application with reduced impact on user perceptible performance of the application. One way the logging system achieves a lightweight impact on the application is to write analytic data to be logged first to a volatile-memory buffer, which can be a relatively inexpensive operation, and then later in batches to a non-volatile memory, which can be a relatively expensive operation. By writing analytic data to be logged first to a volatile-memory buffer, many application tasks that log analytic data are not blocked waiting for the analytic data to be written to a non-volatile memory.

Another way the logging system achieves a lightweight impact on the application is to use execution threads or processes to rotate log files stored on non-volatile memory and to upload log files over a data network to a remote analytics server that are separate from the threads and processes that perform other application tasks such as responding to user interface events and user input. By using separate threads or processes for log rotation and upload, log rotation and upload functions of the logging system have reduced impact on user-facing functions of the application.

Yet another way the logging system is achieves a lightweight impact on the application is to upload analytic data to the analytics server in a compressed format (e.g., a GZIP format). By doing so, less network bandwidth is used to upload the analytic data, thereby conserving battery power and increasing the time between charges on portable computing devices that operate on battery power.

The logging system is secure in the sense that logged analytic data is stored in non-volatile memory in an encrypted form using a stream cipher when writing the analytic data to the non-volatile memory. The encrypted form provides security by obfuscating the contents of the analytic data when stored in non-volatile memory.

The logging system is opportunistic in the sense that log files are uploaded to the analytics server under ideal upload conditions such as when the device is connected to the analytics server by a relatively high-bandwidth network connection such as when connected to the analytics server by a wireless network (e.g., a IEEE 802.11 network) as opposed to a cellular network (e.g., a GSM network). By opportunistically uploading log files, the logging system reduces impact on other potentially more critical application functions.

Logging System Runtime Environment

Figure 2:
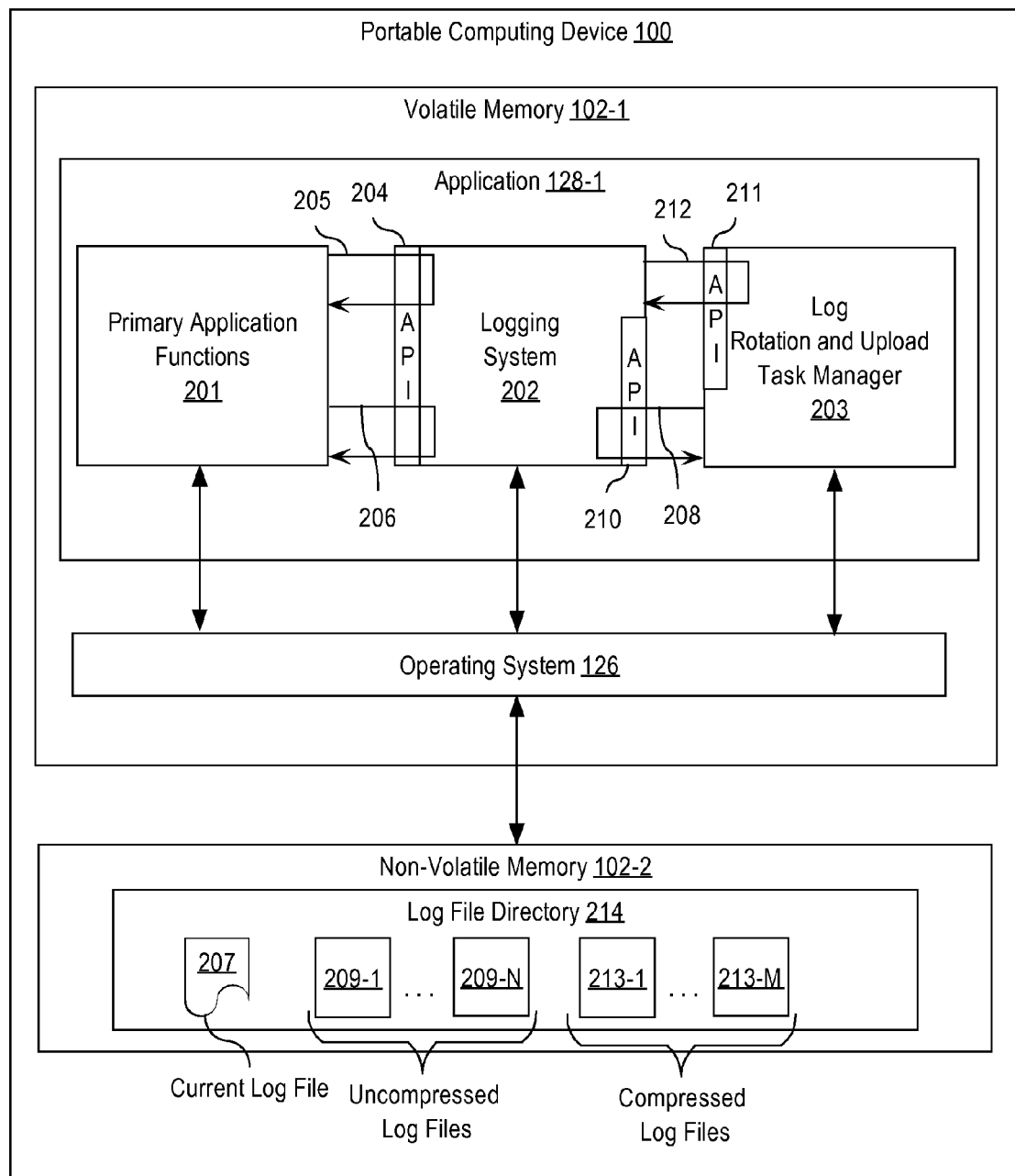
FIG. 2 is a block diagram of a software system for controlling the operation of the portable computing device of FIG. 1 according to some embodiments of the present invention.

FIG. 2 is a high-level block diagram illustrating a runtime environment in which the logging system of some embodiments the present invention may be embodied. As shown, the environment includes device 100 of FIG. 1 having volatile memory 102-1 and non-volatile 102-2. Volatile memory 102-1, which includes any non-volatile memory 102-2 used by operating system 126 for virtual memory, stores modules, components, or sets of instructions currently being executed by device 100 including application 128-1 and operating system 126. Non-limiting examples of volatile memory 102-1 include dynamic RAM, DRAM, or other computer-readable storage medium that requires power to retain information. Non-limiting examples of non-volatile memory 102-2 include solid-state drives (e.g., flash memory), magnetic computer storage devices (e.g., hard disks), optical discs, or other computer-readable storage medium that can retain data when not powered.

Application 128-1 includes sub-modules, sub-components, or sub-sets of instructions including primary application functions 201, logging system 202, and log rotation and upload task manager 203. While in some embodiments as depicted in FIG. 2 logging system 202 and task manager 203 are wholly part of application 128-1, logging system 202 and/or task manager 203, or a portion of portions thereof, are part of operating system 126 and/or another application or applications (not shown) in other embodiments.

Primary application functions 201 include any modules, components, or sets of instructions that implement primary application functions and features of application 128-1 including, for example, features and functions supporting end-user operations such as, for example, receiving and processing user input, generating and display graphical user interface output, storing application data and metadata to volatile memory 128-1 and non-volatile memory 128-2, reading application data and metadata from volatile memory 128-1 and volatile memory 128-2, connecting to and sending data to a server over a network, receiving data from a server over a network, etc. Primary application functions 201 can use services of operating system 126 to carry out application functions.

Logging system 202 offers a "logging" Application Programming Interface (API) 204 to primary application functions 201. Logging API 204 can include an API to initialize logging system 202. For example, a call 205 from primary application functions 201 to logging API 204 to initialize the logging system 202 can be made after application 128-1 starts, launches, or otherwise begins execution. Logging API 204 can also include an API for logging an event with logging system 202. For example, multiple calls 206 from primary application functions 201 to Logging API 204 to log an event can be made during the course of application 128-1 execution by device 100.

The event to log in a call 206 from primary application functions 201 can be one of many different types of events. Example event types are described below. In general, however, as described in greater detail below with respect to some embodiments, an event to be logged in a call 206 to logging system 202 can include a variety of information describing the event including:
 an event label,
 a since device boot timestamp,
 a current timestamp, and
 a data dictionary or other mapping type (e.g., an associative array) containing a set of key-value pairs in which the keys are immutable data types (e.g., strings and numbers) and values can be immutable or mutable data types (e.g., strings, numbers, lists, tuples, data dictionaries and other mapping types).

In response to receiving a call 206 to log an event, logging system 202 serializes the event and writes the serialized form of the event to a buffer (not shown) stored in volatile memory 102-1. For example, the buffer can be a character stream buffer of a predetermined size (e.g., 8K characters). Serializing the event can include producing a character string-based representation of the event. For example, serializing the event can include producing a JavaScript Object Notation (JSON) representation of the event. In addition, logging system 202 periodically flushes the buffer. For example, logging system 102 can flush the buffer after a predetermined number of events to log have been obtained since the last time the buffer was flushed. As another example, the buffer can be automatically flushed when the buffer is full. Flushing the buffer can include cryptographically encrypting the serialized events stored in the buffer using stream cipher and appending (writing) the encrypted serialized form of the events in the buffer to the end of current log file 207 stored in non-volatile memory 102-2.

In some embodiments, the buffer stored in volatile memory is a circular stored queue buffer that stores up to at most N number of events where N is predefined, user configured, or dynamic determined based on historical operating conditions. In an exemplary embodiment, N is sixteen (16). However, in other embodiments N may be less or greater than sixteen (16).

In some embodiments, in response to an unexpected error in or program crash of application 128-1, for example, as manifested by an uncaught programmatic exception in application 128-1, the current events stored in the buffer are stored in an encrypted form in a "core dump" file in non-volatile 102-2. The core dump file can be uploaded by the logging system 202 to the analytics server when the application 128-1 next executes. The core dump file can be uploaded to the analytics sever in an encrypted and/or compressed format or a decrypted and uncompressed format. The core dump file can be the current log file 207, for example. By storing the current events stored in the volatile memory buffer in non-volatile memory when an unexpected error or program crash occurs, potentially valuable information about what may have caused the error or crash is not lost.

Log rotation and upload task manager 203 includes modules, components, of sets of instructions for periodically calling 208 logging system 202 to rotate current log file 207 and to upload uncompressed log files 209-1-209-N to an analytics server. For this, logging system 202 offers rotation and upload API 210 to task manager 203.

In some embodiments, task manager 203 operates in a separate thread or thread or process or processes from the threads or processes that execute primary application functions 201. By doing so, log rotation and uploading functions can be executed concurrently with many primary application functions 201. In addition, task manager 203 offers a scheduling API 211 by which logging system 202 can schedule log rotation and upload tasks with task manager 203. In particular, logging system 202 uses scheduling API 211 to schedule rotation and upload operations to occur at times that are more likely to have reduced impact on primary application functions 201. Logging system 202 can call 212 scheduling API 211 to schedule log rotation to occur at a variety of different times. In some embodiments, logging system 202 calls 212 scheduling API 211 to schedule log rotation to occur at some or all of the following times:
 at application "linking",
 on regular intervals (e.g., every 24 hours),
 on application 128-1 start-up after the application has been upgraded,
 at a certain amount of time (e.g., 10 minutes) after the last time the user has opened the application 128-1 or placed the application 128-1 into the background, or
 after the current log file 207 has reached a certain size (e.g., 512 kilobytes).

As mentioned above, logging system 202 can call 212 scheduling API 211 to schedule log rotation to occur when the application 128-1 is "linked" to a network service that provides application services to application 128-1 over a data network. Application linking can occur at a variety of different times including, for example, when the user of application 128-1 is successfully authenticated by the network service and a new application service session is established with the network service. For example, the user may provide a username and password to primary application functions 201 at device 100 which is then sent over a data network to the network service. Upon receiving the user's credentials, the network service can authenticate the username and password and communicate application service session information (e.g., a browser cookie or other session state information) back to device 100. Such service session information can be used to allow the user to conduct multiple interactions with the network service through application 128-1 without requiring the user to provide authentication credentials to the network service for each such interaction. Primary application functions 201, upon receiving the session information from the network service, can call (not shown) logging system 202 through logging API 204 to schedule an immediate log rotation. In turn, logging system 202 can call 212 task manager 203 to schedule a log rotation for immediate execution. Task manager 203 can then call 208 logging system 202 to rotate current log file 207.

Logging system 202 can also call 212 scheduling API 211 to schedule log uploads to occur at a variety of different times. In some embodiments, logging system 202 calls 212 scheduling API 211 to schedule upload of logs 213-1 213-M to occur at some or all of the following times:

- a short time (e.g., 5 seconds) after application 128-1 starts-up and at regular intervals (e.g., every 7 hours) thereafter,
- on regular intervals (e.g., every 24 hours),
- on application 128-1 start-up after the application has been upgraded,
- at application "linking", or
- at a certain amount of time (e.g., 10 minutes) after the last time the user has opened the application 128-1 or placed the application 128-1 into the background.

Logging system 202, with the aid of operating system 216, can store in non-volatile memory 102-2 current log file 207, one or more uncompressed log files 209-1 through 209-N, and one or more compressed log files 213-1 through 213-M. Logging system 202 can store all log files 207, 209, and 213 in directory 214. Directory 214 can be a file system directory in a file system supported by operating system 126. Although log files 207, 209, and 213 are shown in FIG. 2 as stored in a single directory, log files 207, 209, and 213 can be stored in separate directories or more than one directory.

Current log file 207 can be held open by logging system 202 for appending (writing) serialized and encrypted events to the end of current log file 207. Serialized events can be stored in current log file 207 in an encrypted but uncompressed form.

Uncompressed log files 209 are log files that were previously a current log file but have since been rotated out by logging system 202. Once rotated out, logging system 202 does not write events to uncompressed log files 209. Serialized events stored in uncompressed log files 209 can still be in an encrypted form.

In some embodiments, before uncompressed log files 209 are uploaded to an analytics server, logging system 202 reads encrypted/serialized events from uncompressed log files 209 into volatile memory 102-1. Once in volatile memory 102-1, logging system 102 decrypts the encrypted/serialized events, then compresses the decrypted/serialized events, then encrypts the compressed,/decrypted,/serialized events, and finally stores the encrypted,/compressed/serialized events in compressed log files 213 in non-volatile memory 102-2.

In some embodiments, the decrypting of encrypted/uncompressed events, the compressing of decrypted/uncompressed events, and the encrypting of decrypted/compressed events are performed by separate stream filters arranged in series in a data stream processing pipeline. By doing so, logging system 202 can incrementally stream encrypted/serialized events from uncompressed log files 209 into volatile memory 102-1 without having to load the entire contents of the uncompressed log files 209 into volatile memory 102-1 before beginning to decrypt encrypted/serialized events. Specifically, as encrypted/serialized events are streamed from uncompressed log files 209 they are streamed to the decryption stream filter, the output of the decryption stream filter is streamed to compression stream filter, the output of the compression filter is streamed to encryption filter, and the output of the encryption filter is streamed to compressed log files 213. By streaming the events from uncompressed log files 209 through the various filters and to compressed log files 213, the amount of volatile memory 102-1 used for incremental stream processing can be independent of the size of the uncompressed log files 209. Notably, the amount of volatile memory 102-1 needed to incrementally process all events from an uncompressed log file 209 to a compressed log file 213 can be smaller than the size of the uncompressed log file 209.

Logging system 102 maintains uncompressed log files 209 separately from compressed log files 213 so that log rotation operations and upload operations can occur separately. For example, logging system 102 can rotate current log file 207 to uncompressed log file 209-1 at one time. At a later time, logging system 102 can produce compressed log file 213-1 based on uncompressed log file 209-1 and then upload compressed log file 213-1 to an analytics server.

Logging system 102 stores current log file 207, uncompressed log file 209, and compressed log files 213 in non-volatile memory 102-2 as opposed to volatile memory 102-1 to reduce the amount of analytic data lost in the event of power loss to the device 100 or unexpected catastrophic failure of application 1281-1 (e.g., program crash).

Current log file 207, uncompressed log files 209, and compressed log files 213 can be distinguished by their file names. For example, current log file 207, uncompressed log files 209, and compressed log files 213 can have different filename prefixes or suffixes that distinguish the three different types of log files. Such file name distinctions can be used by logging system 102 to find uncompressed log files 209 that have yet to be uploaded to an analytics server as compressed log files 213.

Exemplary Event

Figure 3:
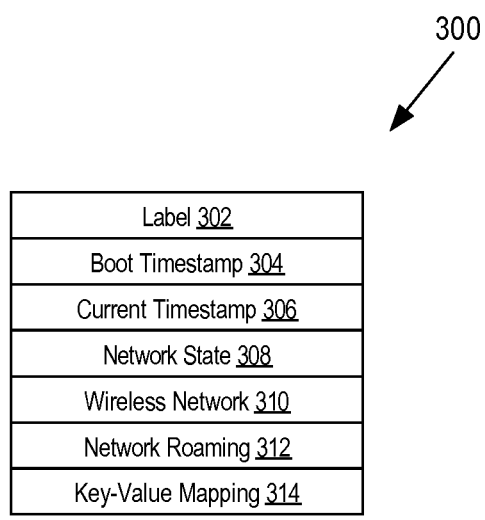
FIG. 3 illustrates an event according to some embodiments of the present invention.

FIG. 3 illustrates an embodiment of an event 300 that may be passed in a call to the logging system to log the event. The call to log event 300 can be made by a primary application function of an application. For example, event 300 can be passed in call 206 from primary application functions 201 to logging system 202. Event 300 includes a number of data fields 302-314. Each of the data fields can be of a different data type. Event 300 can correspond to an object (e.g., an instance of a class) or other data structure.

Event 300 can have a label 302. Label 302 can be an arbitrary character string reflecting the type of event 300. The label 302 can be chosen by the primary application function logging event 300. For example, the label 302 "popup-.shown" can be used when a primary application function logs event 300 after a graphical user interface window popup is shown to the user. This is just one example of a label and virtually any descriptive character string can be used as label 302.

Boot timestamp 304 includes data that reflects the time since the last device boot up that event 300 occurred. Thus, boot timestamp 304 does not need to be relative to the time zone in which the device is located or configured for. A series of events from the same device can be ordered chronologically independent of the device time zone based on the boot timestamps of the events. In some embodiments, a group of events logged at a device is associated with an increasing "log sequence number" (which can be reset from time to time to avoid excessively large sequence numbers or to avoid overflow). For example, the log sequence number can be written to the current log file before writing the associated events to the log file. Within a group of events, the events in the group can be ordered by their associated boot timestamps. Thus, events in all of the groups can be ordered by their associated log sequence numbers and their boot timestamps. Such ordering is still possible even if the device moves time zones, the time zone of the operating system clock of the device is otherwise changed, or the operating system clock time is changed. Boot timestamp 304 can be obtained from a real-time clock of the device.

Current timestamp 306 includes data that reflects the time of the event which may be relative to a particular time zone or locale.

Network state 308 indicates data that indicates the state of the application logging event 300 with respect to a data network at the time event 300 occurred. For example, network state 308 can indicate whether the application is connected to a data network or not connected to a data network at the time of the event. If connected to a data network at the time of the event, network state 308 can indicate what type of connection is established (e.g., an encrypted (e.g., HTTPS) or unencrypted (e.g., HTTP) network connection).

If connected to a data network at the time of the event as indicated by network state 308, wireless network 310 includes data that indicates whether the application is connected to a wireless network (e.g., an IEEE 802.11 network or a cellular network (e.g., GSM)) or not connected to a wireless network (e.g., connected to an IEEE 802.3 network). If connected to a wireless network, wireless network 310 can indicate what type or class of wireless network the application is connected to.

If connected to a data network at the time of the event as indicated by network state 308, network roaming 312 includes data that indicates whether the application is connected to a cellular network in roaming mode.

Key-value mapping 314 is a serializable data structure for storing event-specific data. Key-value mapping 314 can be populated with the event-specific data by the primary application function logging event 300. The data structure can be any suitable data structure for associating keys with values such as a data dictionary, an associative array, or other mapping type. The keys of the data structure can be immutable data types (e.g., strings and numbers). The values of the data structure can be immutable or mutable data types (e.g., lists, tuples, data dictionaries, and associative arrays).

Event 300 is provided as merely an example of a possible event data structure that can be passed in a call to log an event from a primary application function to the logging system. Other event data structures that may be used can have more, less, or different fields than event 300.

Example Event Types

As mentioned, an event can have a character string label that reflects the type of the event. In addition, an event can have event-specific data in the form of a key-value mapping. However, not all events need have event-specific data. Both the label and the event-specific data of an event can be selected by the primary application function logging the event. The label and event-specific data selected can depend on a variety of factors including, but not limited to, the execution context of the application and the primary application function logging the event.

Table 1 below lists example event types without event-specific data. Table 2 below lists example event types with event-specific data.

TABLE 1

Example Event Types Without Event-Specific Data

| Event Label | Event Logged After |
| --- | --- |
| app.launch | The application begins executing on the device. |
| app.link | The application is successfully linked with a network service. |

TABLE 1-continued

Example Event Types Without Event-Specific Data

| Event Label | Event Logged After |
| --- | --- |
| app.unlink | The application successfully unlinks from a network service. |
| login.twofactor.prompted | The user is prompted to login to a network service using two-factor authentication. |
| login.twofactor. | The user successfully authenticates with a network service using two-factor authentication. |
| login.twofactor.didntreceive | The user is prompted to login to a network service using two-factor authentication but the user did not provide authentication credentials in response to the prompt. |
| cu.turned_on | The user enables (turns on) a camera upload feature of the application. |
| cu.turned_off | The user disables (turns off) a camera upload feature of the application. |
| image.view | The application presents a digital image for the user to view. |
| folder.rename | The application renames a file folder at user direction. |
| file.rename | The application renames a file at user direction. |
| help.view_TOS | The application presents terms of service information to the user. |
| help.view_privacy | The application presents network service privacy information to the user. |
| help.send_feedback | The user invokes a provide feedback feature of the application. |

TABLE 2

Example Events With Event-Specific Data

| Event Label | Event-Specific Data | Event Logged After |
| --- | --- | --- |
| popup.shown | which—A string indicating which application was shown. | The application displays a popup graphical user interface window or dialog. |
| popup.closed | which—A string indicating which application was shown. how—A string indicating how the popup was closed. | The application closes a graphical user interface window popup or dialog. |
| download.net.start | id—A download task identifier. class—A download task class name. | The application is about to send a download request to a network service to download data to the device. |
| download.net.end | id—A download task identifier. class—A download task class name. | The application has finished downloading data from a network service. |
| upload.net.start | id —An upload task identifier. class—An upload task class name. | The application is about to send an upload request to a network service to upload data to the service. |
| upload.net.end | id—An upload task identifier. class—An upload task class name. | The application has finished receiving uploading data to a network service. |

The event types in tables 1 and 2 are merely exemplary. Other event types are possible and may be used according to the requirements of the implementation at hand and the present invention is not limited to any particular set of event types.

Logging System Initialization

Figure 4:
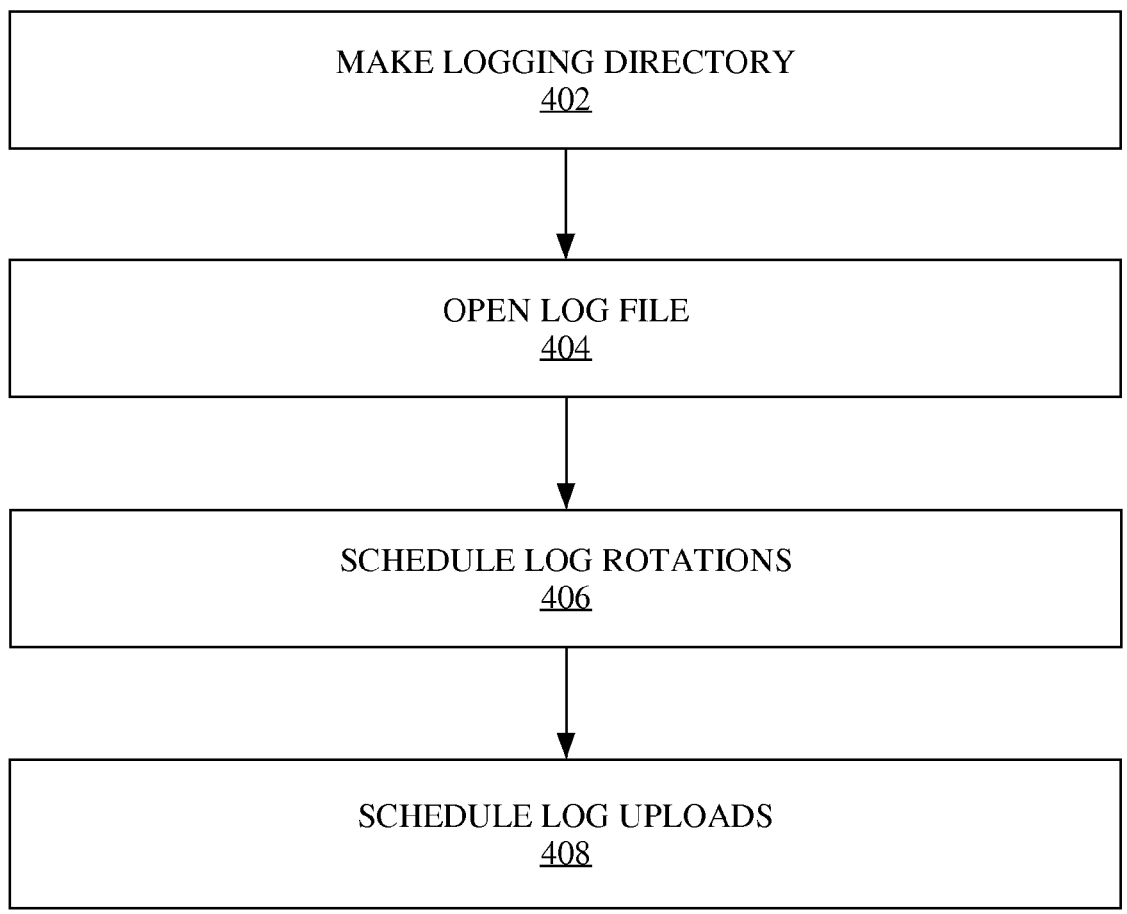
FIG. 4 is a flow diagram illustrating a method for initializing a logging system according to some embodiments of the present invention.

FIG. 4 is a flow diagram that illustrates an embodiment of a method for initiating a logging system. Such a method can be performed by a personal computing device. For example, one or more steps of the method can be performed by personal computing device 100. For example, such a method can be performed by logging system 202 in response to call 205 from primary application functions 201.

At block 402, a logging directory is created in non-volatile memory of the personal computing device if it does not already exist. The logging directory is an operating system file system directory. The logging directory contains log files. The logging directory may have been created by a prior logging system initialization in which case it does not need to be created again. If, however, the logging directory does not exist, then it is created at block 402.

At block 404, a current log file stored in non-volatile memory of the personal computing device is opened for writing. The current log file is an operating system file system file stored in the logging directory. Opening the current log file can include creating the current log file if the current log file does not exist in the logging directory. If the current log file does exist in the logging directory, then the existing current log file is opened for writing.

Opening the current log file can include creating a volatile memory buffer for writing to the current log file. In some embodiments, a character stream buffer of a predetermined size (e.g., 8K characters) is created in volatile memory. Opening the current log file can also include creating a cryptographic stream cipher that cryptographically encrypts characters flushed from the volatile memory character stream buffer before writing the encrypted character stream to the current log file stored in non-volatile memory.

Opening the current log file can also include writing a "header event" to the current log file. The header event can contain useful meta-information about the events that follow the header event in the current log file. In some embodiments, the header event specifies one or more of the following pieces of information:

APP_VERSION—The current version of the application installed on the personal computing device.
USER_ID—An identifier of the user using the application.
DEVICE_ID—An identifier of the personal computing device.
PHONE_MODEL—If the personal computing device is a mobile phone, then the make and/or model of the mobile phone.
ANDROID_VERSION—If the operating system installed on the personal computing device is an ANDROID-based operating system, then the version of the ANDROID operating system.
MANUFACTURER—An identifier of the manufacturer of the personal computing device.
LOG_SERIES_UUID—A unique identifier of user's authentication session. This identifier can be used to identify and order logged events that occurred during the same authentication session.
LOG_SEQUENCE_NUMBER—A sequence number for the current log file. The sequence number can be used to order multiple log files from the same device.

At block 406, one or more log rotation tasks are scheduled for execution at specified times. For example, logging system 202 can make one or more calls 212 to task manager 203 to schedule one or more log rotations. In some embodiments, if rotation of the current log file is past due or the version of the application has changed since the last log rotation (e.g., the application has since been upgraded), then a synchronous log rotation is performed. After the synchronous log rotation has completed, an upload task is scheduled for execution at a predetermined time in the future (e.g., 5 seconds from now). Determination of whether rotation of the current log file is past due can be made based on the current time and by reading data previously written to non-volatile memory of the device that indicates when the next rotation of the current log file is scheduled. If the next rotation data exists in non-volatile memory and the current time is after the next scheduled rotation time, then rotation of the current log file is past due. Detecting when the application has been upgraded can be made similarly by storing the upgraded version of the application in non-volatile memory of the device after the application has been upgraded to a new version. If the new current version is different from the old upgraded version, then the application has been upgraded. If the synchronous log rotation was performed because rotation of the current log file was past due or the version of the application changed, or if no rotation of the current log file is currently scheduled, then a new log rotation is scheduled to execute at a predetermined time in the future (e.g., 24 hours from now) and the time of the next schedule log rotation is written to non-volatile memory of the device. If, on the other hand, rotation of the current log file is currently scheduled but the time for rotation has not yet arrived, then a new log rotation is scheduled to execute at the currently scheduled time. Thus, with this embodiment, the current log file is rotated immediately only if rotation is past due or the application has been upgraded. Otherwise, the current log file is scheduled to be rotated at the next scheduled interval (e.g., every 24 hours).

At block 408, one or more log upload tasks are scheduled for execution at specified times. For example, logging system 202 can make one or more calls 212 to task manager 203 to schedule one or more log uploads. In some embodiments, an upload tasks is scheduled to execute in a separate thread or process at a predetermined time (e.g., 5 seconds from now). In addition, an upload task is scheduled to execute in a separate thread or process at a predetermined intervals thereafter (e.g., every 7 hours thereafter). Thus, with this embodiment, if a log file is available for upload at the time of initialization it will be uploaded to an analytics server soon after the initialization is commenced.

Logging an Event

Figure 5:
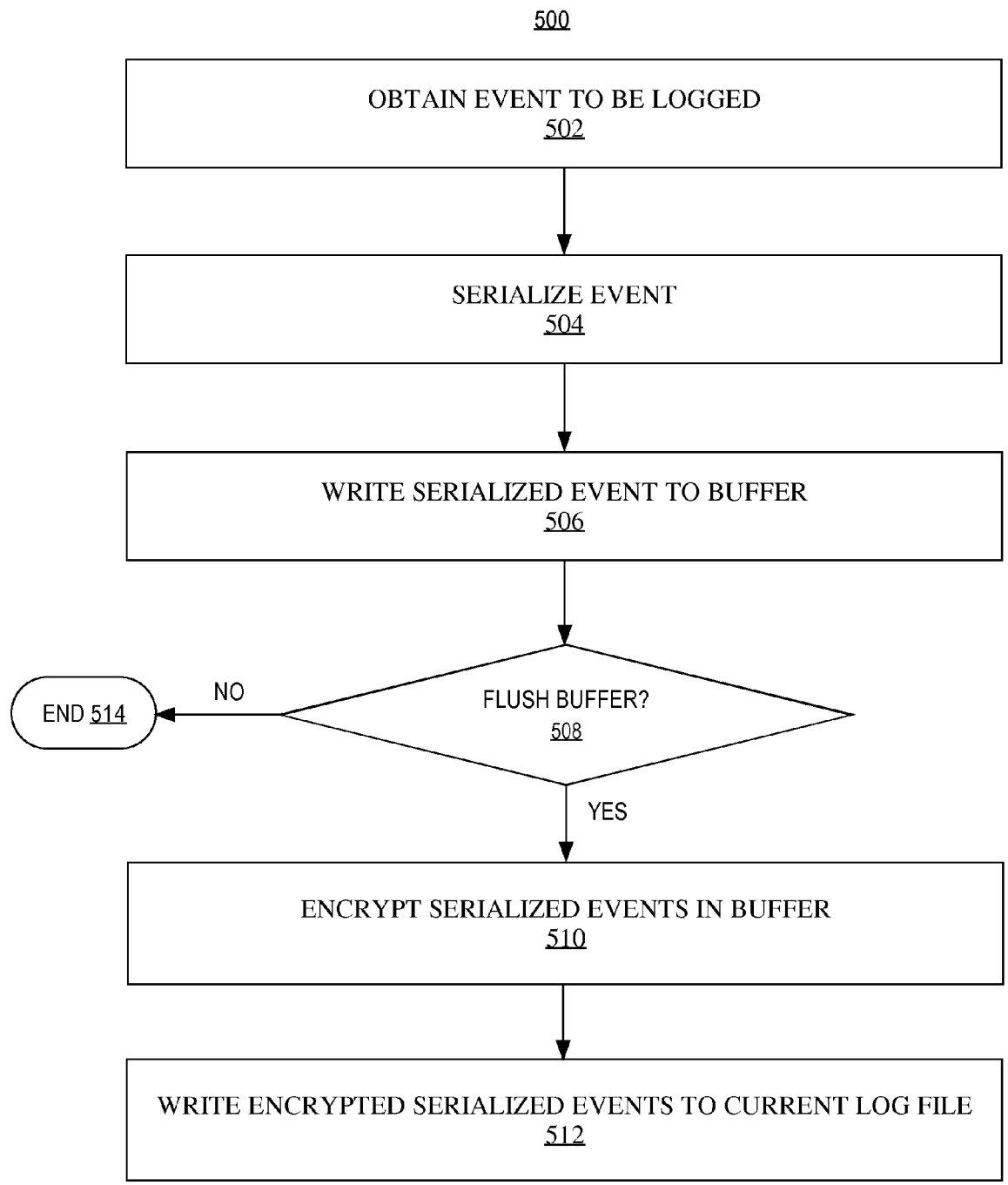
FIG. 5 is a flow diagram illustrating a method for logging an event according to some embodiments of the present invention.

FIG. 5 is a flow diagram that illustrates an embodiment of a method for logging an event. Such a method can be performed by a personal computing device. For example, one or more steps of the method can be performed by personal computing device 100. For example, such a method can be performed by logging system 202 in response to call 206 from primary application functions 201 to log an event such as event 300.

At block 502, an event to be logged is obtained. For example, the obtained event can be instance of event 300.

At block 504, the obtained event is serialized. In some embodiments, serializing the event includes producing a character string representation of the event. For example, the character string representation can be a JSON representation or other character string-based representation.

At block 506, the serialized form of the event is written to a character string buffer resident in volatile memory of the device. The buffer can contain other serialized events previously written to the buffer for previously obtained events.

At block 508, a determination is made whether to flush the character string buffer. The determination can be based on a wide variety of factors including, but not limited to:
the number of serialized events currently in the buffer,
the total amount of buffer space consumed by the serialized events currently stored in the buffer, and/or
the amount of fee space remaining in the buffer.

If, at block 508, a determination is made to flush the character string buffer, then, at block 510, the serialized events currently stored in the buffer are encrypted using a cryptographic stream cipher. At block 512, the encrypted serialized events produced at block 510 are appended to the current contents of the current log file stored in non-volatile memory.

If, on the other hand, at block 508, a determination is made not to flush the buffer, then the method ends at block 514.

Rotating the Current Log File

Figure 6:
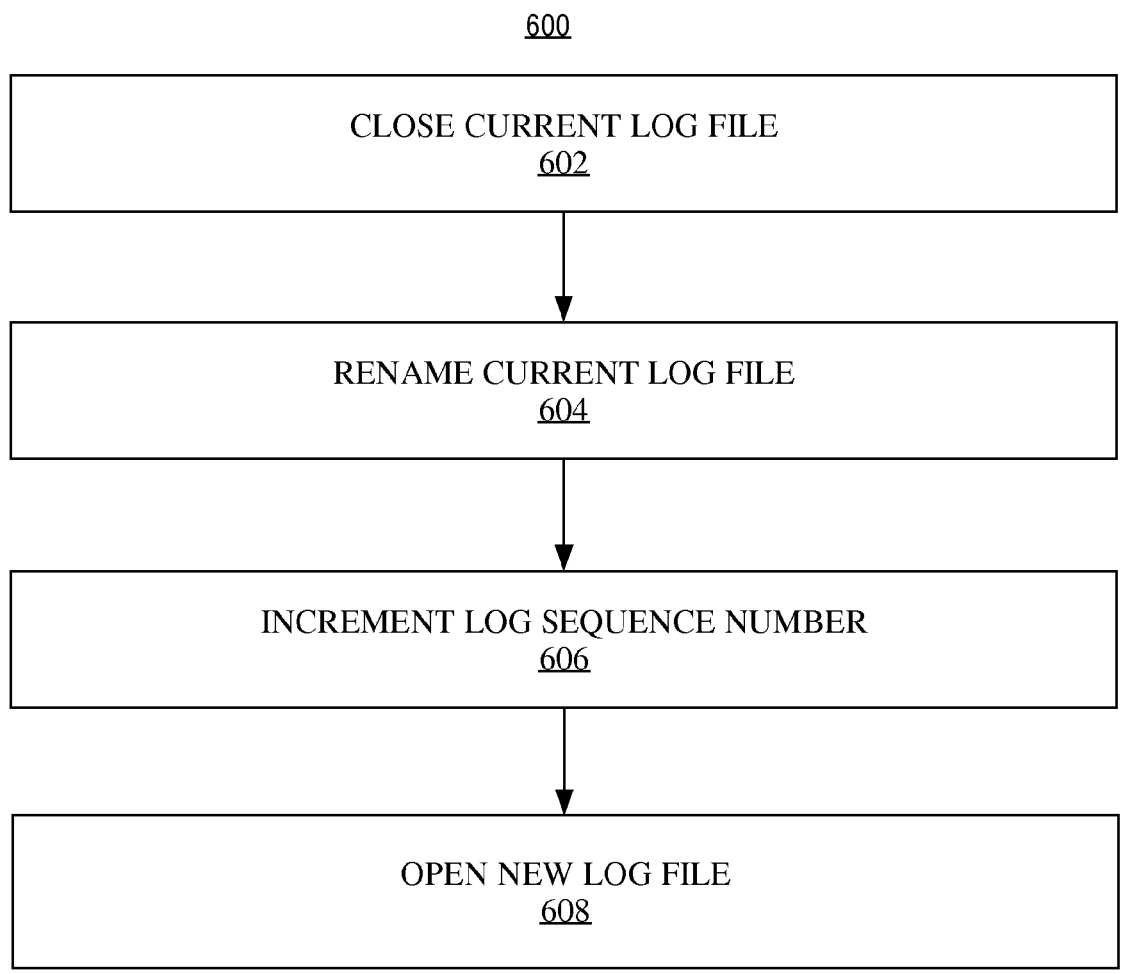
FIG. 6 is a flow diagram illustrating a method for rotating a log file according to some embodiments of the present invention.

FIG. 6 is a flow diagram that illustrates an embodiment of a method for rotating a current log file. Such a method can be performed by a personal computing device. For example, one or more steps of the method can be performed by personal computing device 100. For example, such a method can be performed by logging system 202 in response to call 208 from task manager 203 to rotate current log file 207 to an uncompressed log file 209. Such a method can be performed in a thread or process separate from the threads and processes that perform primary application functions of an application.

At block 602, the current log file is closed for writing.

At block 604, the current log file is renamed with a file name that indicates that the current log file has been rotated out. For example, the current log file can be renamed to a file name with a particular prefix and/or suffix that indicates that the renamed file is a log file that has been rotated.

At block 606, the log sequence number is incremented. The log sequence number can be stored in non-volatile memory of the device. Incrementing the log sequence number can include reading the current log sequence number from non-volatile memory, incrementing the current log sequence number by a fixed amount, and writing the incremented log sequence number back to non-volatile memory. As mentioned above, the current log sequence number can be written as part of a header event to the current log file so that ordering of multiple log files from the same device is possible.

At block 608, a new current log file is opened. Performance of this step can be similar to the step corresponding to block 404 of method 400 described above.

Uploading Uncompressed Events as Compressed Events

Figure 7:
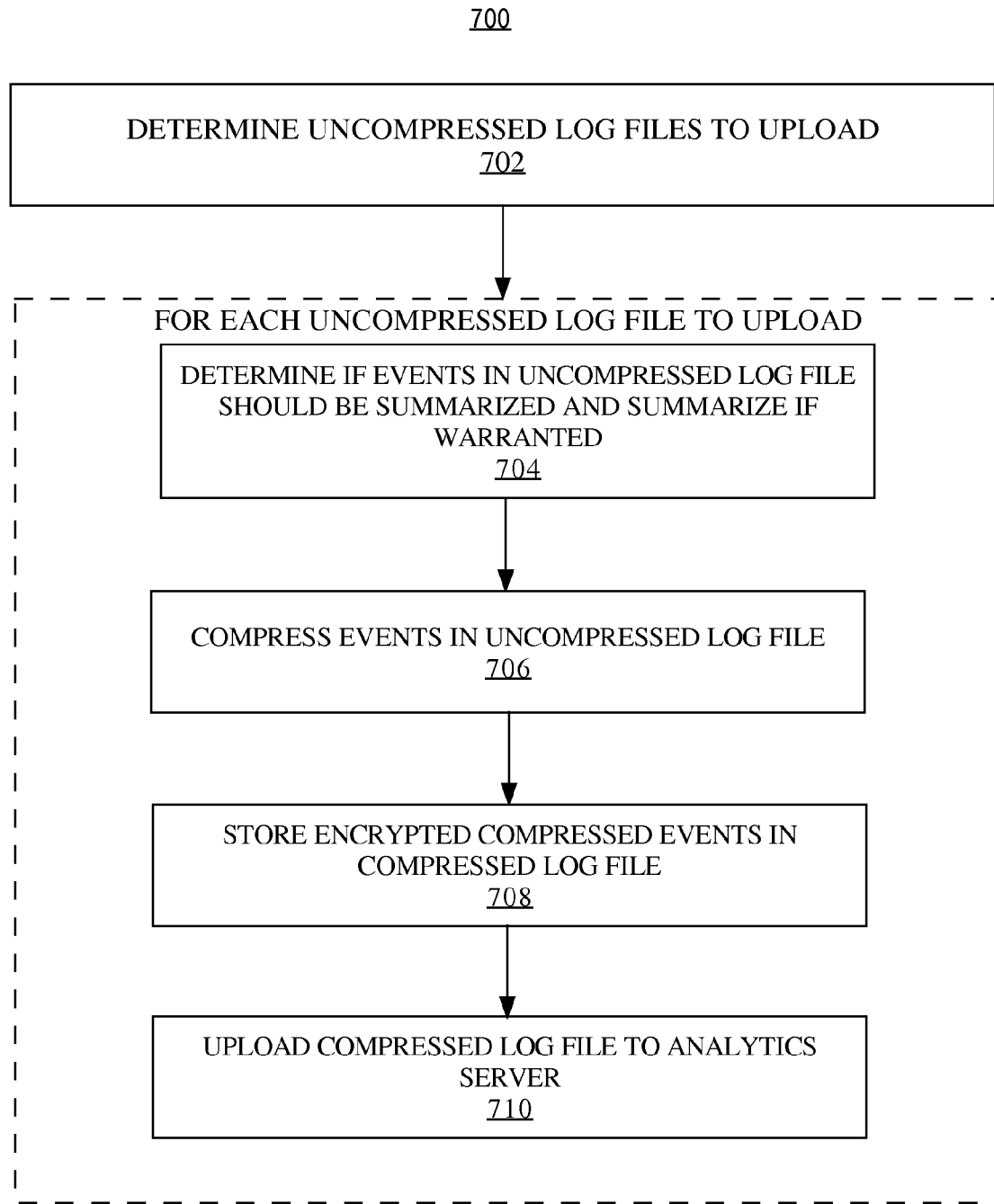
FIG. 7 is a flow diagram illustrating a method for uploading log files to an analytics server according to some embodiments of the present invention.

FIG. 7 is a flow diagram that illustrates an embodiment of a method for uploading serialized/encrypted/uncompressed events in one or more uncompressed log files as serialized/compressed events, which can also be decrypted or encrypted. Such a method can be performed by a personal computing device. For example, one or more steps of the method can be performed by personal computing device 100. For example, such a method can be performed by logging system 202 in response to call 208 from task manager 203 to upload uncompressed log files 209. Such a method can be performed in a thread or process separate from the threads and processes that perform primary application functions of an application.

At block 702, the logging directory is scanned for uncompressed log files to upload. For example, logging directory 214 can be scanned for uncompressed log files 209-1 through 209-N. The scanning can be based on the file name of the uncompressed log files. For example, scanning can include enumerating files in the logging directory and identifying files with a file name pattern that indicates that the file is an uncompressed log file.

Steps corresponding to blocks 704, 706, 708, and 710 are performed for each uncompressed log file identified in the step corresponding to block 702.

At block 704, a determination is made whether events in the current uncompressed log file should be summarized before upload. Summarization is useful if a certain type of event is unexpectedly logged very frequently. The determination can include counting the number of events and the number of each different type of event according to each event's label. Determining whether events in the current uncompressed log file should be summarized can be based on a variety of factors including, but not limited to:

the total number of events in the current uncompressed log file, and/or the percentage of the total number of events that involve a certain type or types of events.

For example, a determination to summarize events in the current uncompressed log file can be made in response to detecting that the total number of events in the log file is greater than a predetermined threshold (e.g., 250 events) and the top N (e.g., 2) most common types of events in the log file account for more than a predetermined percentage (e.g., 99%) of the total number of events. In some embodiments, a set of "whitelisted" events is determined which include events that do not count toward the determination of whether to summarize the log file. In this embodiment, for example, a determination to summarize events in the current uncompressed log file can be made in response to detecting that the total number of events in the log file is greater than a predetermined threshold (e.g., 250 events) and the top N (e.g., 2) most common non-whitelisted types of events in the log file account for more than a predetermined percentage (e.g., 99%) of the total number of events. The set of whitelisted events can be determined based on historical log files uploaded to the analytics server that satisfy the previous conditions.

Also at block 704, if events in the current uncompressed log file should be summarized, then the contents of the uncompressed log file is replaced with an event summary. The event summary can include the original header event followed by a summary of the other events in the original uncompressed log file. The summary of the other events can include for each event type summarized, the label of the summarized event and the number of times the event was founded in the original uncompressed log file. Other event summaries are possible and the present invention is not limited to any particular event summary.

At block 706, the serialized and encrypted but uncompressed form of the events stored in the current uncompressed log file is read into volatile memory of the device as a serialized, decrypted, and uncompressed form of the events. The encrypted form can be decrypted using a cryptographic stream cipher. The serialized, decrypted, and uncompressed form of the events is compressed using a compression algorithm (e.g., GZIP).

At block 708, the serialized, decrypted, and compressed form of the events are encrypted using a cryptographic stream cipher and then written to a compressed log file stored in non-volatile memory of the device.

At block 710, the compressed log file is uploaded to an analytics server for further processing. In some embodiments, the encrypted/compressed events stored in the compressed log file are decrypted before being uploaded as decrypted/compressed events to the analytics server. By doing so, the analytics server does not need the encryption key used to encrypt the events in order to decrypt the events. Security of the events on the network can be protected using other encryption mechanisms such as by encapsulating the decrypted/compressed event stream in a Secure Hyper Text Transfer Protocol (HTTPS) stream.

In the above example method there is a one-to-one correspondence between uncompressed log files and compressed log files that are uploaded to an analytics server. In other embodiments, there is a one-to-many or many-to-one correspondence between uncompressed log files and compressed log files. For example, the serialized, encrypted, and uncompressed form of events stored in one uncompressed log file can be stored in a serialized, encrypted, and compressed form across multiple compressed files. Similarly, the serialized, encrypted, and uncompressed form of events stored in multiple uncompressed log files can be stored in a serialized, encrypted, and compressed form in a single compressed log file.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A computer-implemented method, comprising:
at a portable computing device having volatile memory and non-volatile memory:
(a) obtaining, from a mobile application running on the portable computing device, a plurality of events to be logged;
(b) serializing the plurality of events to be logged to produce a serialized form of the events;
(c) storing the serialized form of the events in volatile memory of the device;
(d) encrypting the serialized form of the events to produce a serialized and encrypted form of the events;
(e) storing the serialized and encrypted form of the events in non-volatile memory of the device;
(f) decrypting the serialized and encrypted form of the events to produce a serialized and decrypted form of the events;
(g) storing the serialized and decrypted form of the events in volatile memory of the device;
(h) compressing the serialized and decrypted form of the events to produce a compressed, serialized, and decrypted form of the events;
(i) encrypting the compressed, serialized, and decrypted form of the events to produce an encrypted, compressed, and serialized form of the events and storing the encrypted, compressed, and serialized form of the events in non-volatile memory of the device.

2. The method of claim 1, further comprising:
uploading the encrypted, compressed, and serialized form of the events to a server.

3. The method of claim 1, wherein each obtained event is associated with a string label reflecting a type of the event.

4. The method of claim 1, wherein each obtained event is associated with a timestamp reflecting a time since the device last booted.

5. The method of claim 1, wherein the plurality of events to be logged is a first plurality of events; and wherein the method further comprises:
prior to obtaining the first plurality of events, obtaining a second plurality of events to be logged;
determining whether the second plurality of events should be summarized; and
summarizing the second plurality of events to produce the first plurality of events;
wherein the first plurality of events consists of a fewer number of events than the second plurality of events.

6. The method of claim 5, wherein determining whether the second plurality of events should be summarized includes counting the second plurality of events by event type.

7. The method of claim 1, wherein encrypting the compressed, serialized, and decrypted form of the events includes encrypting the compressed, serialized, and decrypted form of the events using a cryptographic stream cipher.

8. The method of claim 1, wherein the serialized form of the events is a JavaScript Object Notation (JSON) form.

9. The method of claim 1, wherein steps (a), (b), (c), (d), (e) are performed in one or more threads or processes that are separate from one or more threads or processes that perform steps (f), (g), (h), and (i).

10. The method of claim 1, wherein the steps (a)-(i) of the method of claim 1 are performed by an application executing on the device.

11. The method of claim 1, further comprising:
flushing a buffer storing the serialized form of the events in volatile memory of the device;
wherein storing the serialized and encrypted form of the events in non-volatile memory of the device is performed in response to flushing the buffer storing the serialized form of the events in volatile memory of the device.

12. The method of claim 1, further comprising:
streaming the encrypted, compressed, and serialized form of the events from non-volatile memory of the device to produce a stream of the encrypted, compressed, and serialized events in volatile memory of the device;
decrypting the stream of the encrypted, compressed, and serialized events to produce a stream of the decrypted, compressed, and serialized events in volatile memory of the device; and
uploading the stream of the decrypted, compressed, and serialized events from volatile memory of the device to a server.

13. The method of claim 1, wherein decrypting the serialized and encrypted form of the events and storing the serialized and decrypted form of the events in volatile memory of the device comprises:
streaming the serialized and encrypted form of the events from non-volatile memory of the device to produce a stream of the encrypted and serialized events in volatile memory of the device; and
decrypting the stream of the encrypted and serialized events to produce a stream of the serialized and decrypted events in volatile memory of the device.

14. The method of claim 13, wherein compressing the serialized and decrypted form of the events to produce a compressed, serialized, and decrypted form of the events, encrypting the compressed, serialized, and decrypted form of the events to produce an encrypted, compressed, and serialized form of the events, and storing the encrypted, compressed, and serialized form of the events in non-volatile memory of the device comprises:
compressing the stream of the serialized and decrypted events to produce a stream of the compressed, serialized, and decrypted events in volatile memory of the device;
encrypting the stream of the compressed, serialized, and decrypted events to produce a stream of the encrypted, compressed, and serialized events; and
storing the stream of the encrypted, compressed, and serialized events in non-volatile memory of the device.

15. The method of claim 1, wherein the plurality of events are caused by a plurality of mobile applications, that includes the mobile application, running on the portable computing device.

16. The method of claim 1, wherein the plurality of events to be logged comprises analytic data; wherein the analytic data comprises at least one of:

analytic data reflecting a user interaction with a graphical user interface element of the mobile application;

analytic data reflecting user usage of a feature of the mobile application;

analytic data reflecting a battery level of a battery device of the portable computing device;

analytic data reflecting an error in the mobile application;

analytic data reflecting a byte-rate of data received by the mobile application from a network; or analytic data reflecting an interaction of the mobile application with another mobile application.

17. A portable computing device comprising:
volatile memory;
non-volatile memory;
one or more processors; and
a logging module configured for:
(a) obtaining, from a mobile application running on the portable computing device, a plurality of events to be logged;
(b) serializing the plurality of events to be logged to produce a serialized form of the events;
(c) storing the serialized form of the events in the volatile memory;
(d) encrypting the serialized form of the events to produce a serialized and encrypted form of the events;
(e) storing the serialized and encrypted form of the events in the non-volatile volatile memory;
(f) decrypting the serialized and encrypted form of the events to produce a serialized and decrypted form of the events;
(g) storing the serialized and decrypted form of the events in the volatile memory;
(h) compressing the serialized and decrypted form of the events to produce a compressed, serialized, and decrypted form of the events;
(i) encrypting the compressed, serialized, and decrypted form of the events to produce an encrypted, compressed, and serialized form of the events and storing the encrypted, compressed, and serialized form of the events in the non-volatile volatile memory.

18. The device of claim 17, wherein the logging module is further configured for:
uploading the encrypted, compressed, and serialized form of the events to a server.

19. The device of claim 17, wherein each obtained event is associated with a string label reflecting a type of the event.

20. The device of claim 17, wherein each obtained event is associated with a timestamp reflecting a time since the device last booted.

21. The device of claim 17, wherein the plurality of events to be logged is a first plurality of events; and wherein the logging module is further configured for:
prior to obtaining the first plurality of events, obtaining a second plurality of events to be logged;
determining whether the second plurality of events should be summarized; and
summarizing the second plurality of events to produce the first plurality of events;
wherein the first plurality of events consists of a fewer number of events than the second plurality of events.

22. The device of claim 21, wherein determining whether the second plurality of events should be summarized includes counting the second plurality of events by event type.

23. The device of claim 17, wherein encrypting the compressed, serialized, and decrypted form of the events includes encrypting the compressed, serialized, and decrypted form of the events using a cryptographic stream cipher.

24. The device of claim 17, wherein the serialized form of the events is a JavaScript Object Notation (JSON) form.

25. The device of claim 17, wherein steps (a), (b), (c), (d), (e) are performed in one or more threads or processes that are separate from one or more threads or processes that perform steps (f), (g), (h), and (i).

26. The device of claim 17, wherein the logging module is a component part of the mobile application.

27. The device of claim 17, wherein the logging module is further configured for:
flushing a buffer storing the serialized form of the events in the volatile memory;
wherein storing the serialized and encrypted form of the events in the non-volatile volatile memory is performed in response to flushing the buffer storing the serialized form of the events in the volatile memory.

28. The device of claim 17, wherein the logging module is further configured for:
streaming the encrypted, compressed, and serialized form of the events from the non-volatile volatile memory to produce a stream of the encrypted, compressed, and serialized events in the volatile memory;
decrypting the stream of the encrypted, compressed, and serialized events to produce a stream of the decrypted, compressed, and serialized events in the volatile memory; and
uploading the stream of the decrypted, compressed, and serialized events from the volatile memory to a server.

29. The device of claim 17, wherein decrypting the serialized and encrypted form of the events and storing the serialized and decrypted form of the events in the volatile memory comprises:
streaming the serialized and encrypted form of the events from the non-volatile volatile memory to produce a stream of the encrypted and serialized events in the volatile memory; and
decrypting the stream of the encrypted and serialized events to produce a stream of the serialized and decrypted events in the volatile memory.

30. The device of claim 29, wherein compressing the serialized and decrypted form of the events to produce a compressed, serialized, and decrypted form of the events, encrypting the compressed, serialized, and decrypted form of the events to produce an encrypted, compressed, and serialized form of the events, and storing the encrypted, compressed, and serialized form of the events in the non-volatile volatile memory comprises:
compressing the stream of the serialized and decrypted events to produce a stream of the compressed, serialized, and decrypted events in the volatile memory;
encrypting the stream of the compressed, serialized, and decrypted events to produce a stream of the encrypted, compressed, and serialized events; and
storing the stream of the encrypted, compressed, and serialized events in the non-volatile volatile memory.

* * * * *